455-803 AU 233 EX

XR 3,885,231

United States Patent [19]

Gaddy et al.

[11] 3,885,231

[45] May 20, 1975

[54] REMOTE CONTROL CIRCUIT HAVING LIGHT COUPLING

[75] Inventors: Thomas W. Gaddy, Florence, S.C.; Larry H. Wohlford, Rustburg, Va.

[73] Assignee: General Electric Company, Lynchburg, Va.

[22] Filed: Oct. 19, 1973

[21] Appl. No.: 407,905

[52] U.S. Cl. ..... 340/172; 340/147 PC; 340/166 EL

[51] Int. Cl. ........................................ H03k 17/60

[58] Field of Search .......... 340/172, 147 PC, 324 R; 250/199, 548–554; 307/111, 235, 278, 311; 315/134, 153, 154, 155

[56] References Cited

UNITED STATES PATENTS

| | | | |
|---|---|---|---|
| 3,631,268 | 12/1971 | Matthews | 307/311 X |
| 3,693,027 | 9/1972 | Garaway | 307/311 UX |
| 3,796,951 | 3/1974 | Joseph | 340/324 X |

*Primary Examiner*—Harold I. Pitts

[57] ABSTRACT

A control circuit produces a separate control signal in response to each direct current magnitude and polarity received on an input line from a remote controlling location. The control circuit includes a voltage reference circuit connected to the input line. The voltage reference circuit causes a transistor to turn on in response to line current below a selected magnitude and causes the transistor to turn off in response to line current above that selected magnitude. A light emitting diode is connected in parallel with the transistor and is turned on when the transistor is turned off, and is turned off when the transistor is turned on. A light sensitive transistor is positioned to receive light from the light emitting diode. The light sensitive transistor provides a signal in response to light from the light emitting diode. A plurality of such circuits may be used to provide a separate signal in response to each current magnitude and polarity.

7 Claims, 3 Drawing Figures

FIG.1
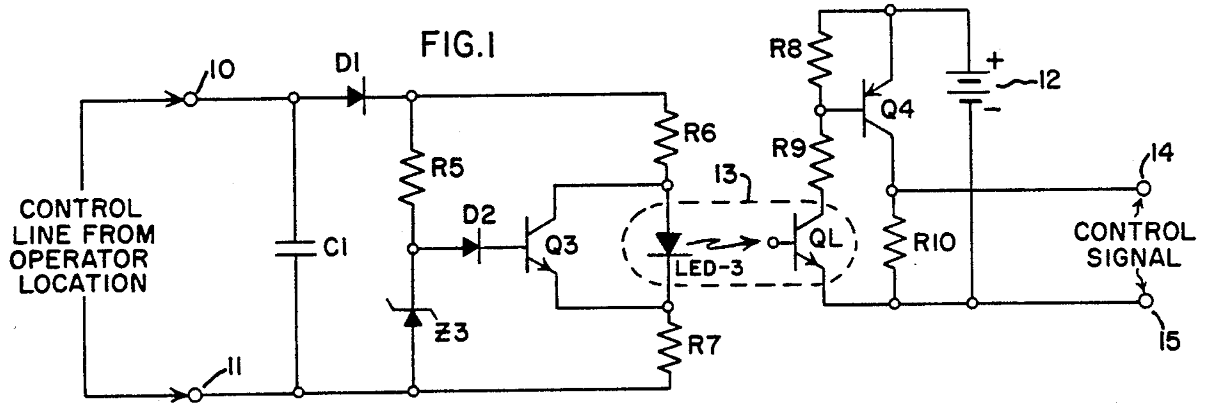
FIG.2
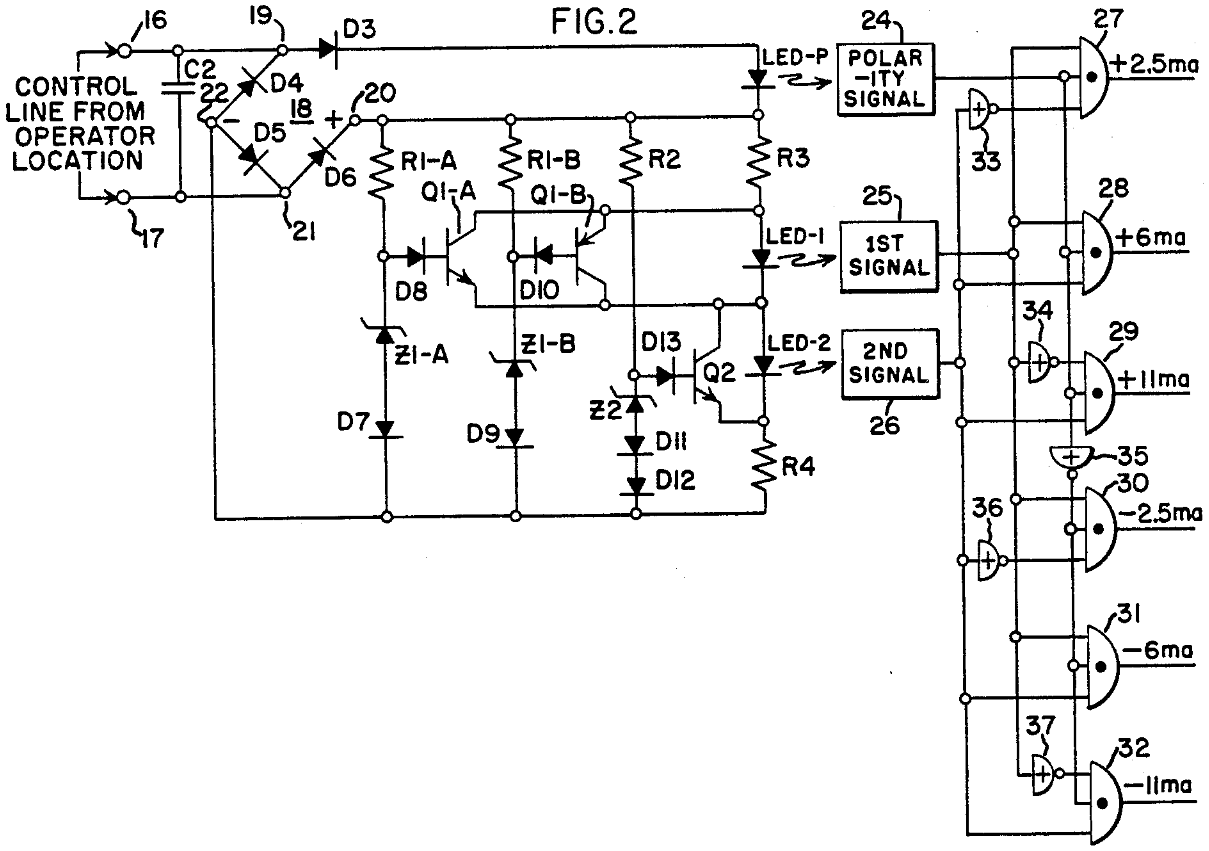
FIG.3
| CONTROL CURRENT | Q1-A | Q1-B | LED-1 | Q2 | LED-2 | 1ST SIGNAL | 2ND SIGNAL |
|---|---|---|---|---|---|---|---|
| 0 | OFF | OFF | OFF | OFF | OFF | 0 | 0 |
| 1ma (TEMPORARY) | ON | OFF | OFF | ON | OFF | 0 | 0 |
| 2.5ma | OFF | OFF | ON | ON | OFF | 1 | 0 |
| 6ma | OFF | OFF | ON | OFF | ON | 1 | 1 |
| 11 ma | OFF | ON | OFF | OFF | ON | 0 | 1 |

REMOTE CONTROL CIRCUIT HAVING LIGHT COUPLING

CROSS-REFERENCE TO RELATED APPLICATION

This application describes a remote control circuit for use with a line connected to remote controlling apparatus such as described in U.S. Pat. No. 3,768,072, granted Oct. 23, 1973, and filed Mar. 26, 1973; Ser. No. 344,574.

BACKGROUND OF THE INVENTION

Our invention relates to a remote control circuit, and particularly to a remote control circuit that is supplied with direct current of a selected magnitude and polarity, and that produces a separate control signal in response to each direct current magnitude and polarity.

Electrical apparatus, particularly radio transmitting and receiving equipment, must frequently be placed at some location which is remote from the location at which the apparatus is to be controlled. For example, it is desirable that a radio transmitter, receiver, and antenna be placed at a location, such as on a mountain top, which provides good communication. However, it is also desirable that the operator or person utilizing the transmitter and receiver be at a convenient location, such as in an office building in a city, which is remote from the mountain top. It is not only necessary that a communication line be provided between the operator location and the transmitter-receiver location, but is is also desirable that the remote radio equipment can be controlled from the operator location. In fact, some control functions for remote radio equipment are required under the rules and regulations of the Federal Communications Commission. These communication and control functions can be provided over a line or lines running between the operator location and the transmitter-receiver location. Frequently, these lines are provided by a telephone company, and the lines require the use of direct current to indicate the control functions desired. In order that the number of control lines be held to a minimum, different control functions are indicated by one of two polarities of direct current and by one of several magnitudes of direct current. For one polarity, one wire of the control line is positive and the other wire negative. For the other polarity, the one wire of the control line is negative and the other wire is positive. This polarity selection permits two control functions to be indicated for a given magnitude of current. Additional control functions can be indicated by changing the magnitude or level of the direct current on the control line. Thus, with two selectable polarities and, for example, three selectable current magnitudes, it is possible to indicate six control functions.

At the transmitter-receiver location, previous circuits for responding to the polarity and magnitude of the direct current sent over a control line from the operator location have utilized an oscillator. This oscillator operates in the kilohertz region and its output is supplied to one of several output circuits in response to a particular polarity and magnitude of the incoming direct current. Each of the output circuits performs some function, such as turning on the transmitter, turning off the transmitter, or changing the transmitter frequency. While such circuits have performed well, the oscillator has presented a problem. Its output may be coupled to the control line and cause line interference. In some instances, the oscillator output has heterodyned or mixed with the transmitter output signals and caused spurious radiations and interference.

Accordingly, a primary object of our invention is to provide an improved remote control circuit that eliminates use of an oscillator at the controlled (i.e., transmitter-receiver) location.

Another object of our invention is to provide a novel remote control circuit having light sensitive devices and an associated circuit for responding to direct current polarity and magnitude to provide a separate control signal.

SUMMARY OF THE INVENTION

Briefly, these and other objects are achieved in accordance with our invention by one or more light emitting diodes that are respectively shunted by a transistor. If a transistor is turned on, its associated light emitting diode is turned off. If a transistor is turned off, its associated light emitting diode is turned on. Each transistor is selectively turned off by a respective voltage reference circuit that responds to a selected magnitude of direct current. A light sensitive device is respectively and operatively associated with each light emitting diode to respond to light from its respective light emitting diode and provide a control signal. If response to direct current polarity is also desired, a bridge circuit and light emitting diode is provided, and this light emitting diode emits light in response to current of a selected polarity. The polarity light emitting diode has an associated light sensitive device which provides a polarity signal. The current magnitude signals and the polarity signal can be logically gated to provide respective control signals responsive to each selected current magnitude and polarity. The light emitting diodes and the light sensitive devices provide good response and isolation, so that no interference is caused to the control line or is radiated by this control circuit.

BRIEF DESCRIPTION OF THE DRAWING

The subject matter which we regard as our invention is particularly pointed out and distinctly claimed in the claims. The structure and operation of our invention, together with further objects and advantages, may better understood from the following description given in connection with the accompanying drawing, in which:

FIG. 1 shows a circuit diagram of a single function remote control circuit in accordance with our invention;

FIG. 2 shows a circuit diagram of a multiple function remote control circuit in accordance with our invention; and FIG. 3 shows a table illustrating the operation of the circuit diagram of FIG. 2.

DESCRIPTION OF THE PREFERRED EMBODIMENTS

In FIG. 1, we have shown a circuit diagram of a single function remote control circuit in accordance with our invention. Our circuit is provided with input terminals 10, 11 which are adapted to be connected to a control line extending from an operator location. Since the circuit of FIG. 1 provides only a single function, we have assumed by way of example that when this function is desired, a direct current of 6 milliamperes is supplied to the control line with the line polarity arranged such that the input terminal 10 would be positive and the input terminal 11 would be negative. A capacitor C1 is connected between the terminals 10, 11 to provide a low impedance to audio signals. A diode D1 is connected to the terminal 10, and a resistor R6 is connected to the diode D1. A light emitting diode LED-3 is connected to the resistor R6, and a resistor R7 is connected between the diode LED-3 and the other terminal 11. When current of sufficient magnitude flows through the diode LED-3, the diode emits light in some portion of the light spectrum. An NPN type transistor Q3 has its emitter-collector path connected in shunt or in parallel with the diode LED-3. The base of the transistor Q3 is connected through a diode D2 to the junction of a reference circuit comprising a resistor R5 and a zener diode Z3. The reference circuit is connected on the input terminal side of the resistors R6, R7.

The circuit is arranged so that when the current is below the assumed selected magnitude of 6 milliamperes, the transistor Q3 conducts and short-circuits the diode LED-3 so that this diode does not emit light. However, when the current exceeds or reaches the selected magnitude of 6 milliamperes, the transistor Q3 is turned off so that current can then flow through the diode LED-3 and cause light to be emitted or produced. The point at which the transistor Q3 is turned off is determined by the magnitude of the resistor R7 and the breakdown point of the zener diode Z3. When the current is below the selected magnitude of 6 milliamperes, the base to emitter voltage of the transistor Q3 is sufficiently positive to cause the transistor Q3 to conduct and short-circuit the diode LED-3. However, when the current magnitude reaches 6 milliamperes, the voltage across the zener diode Z3 is sufficient to cause it to conduct and maintain a constant voltage. This current causes a greater voltage to be developed across the current indicating resistor R7 so that the base to emitter voltage is zero or negative. This causes the transistor Q3 to be turned off. When this happens, the current that formally flowed through the collector-emitter path of the transistor Q3 flows through the diode LED-3, and this diode produces light.

The circuit for providing a control signal in response to this light comprises a light sensing transistor QL. This transistor QL is positioned so that its base receives light from the diode LED-3. As known in the art, the diode LED-3 and the light sensitive transistor QL may be obtained as a unit, as indicated by the dashed enclosure lines 13. When the transistor QL receives light, it permits collector-emitter current to flow. The collector of the transistor QL is connected through a resistor R9 and a resistor R8 to the positive terminal of a direct current source 12, and the emitter of the transistor QL is connected to the negative terminal of the source 12. The junction of the resistors R8, R9 is connected to the base of a PNP type transistor Q4. The emitter of the transistor Q4 is connected to the positive terminal of the source 12 and the collector of the transistor Q4 is connected through a resistor R10 to the negative terminal of the source 12. Output signals are derived from the resistor R10 and supplied to output terminals 14, 15.

When the transistor QL receives no light, it is turned off, and the transistor Q4 is turned off. When light is received by the transistor QL, it lowers the voltage at the junction of the resistors R8, R9 and turns the transistor Q4 on. This causes a voltage to be developed across the resistor R10 and this voltage may be used as a control signal to perform any desired function. This output control signal is produced in response to the current at the input terminals 10, 11 exceeding or reaching the assumed magnitude of 6 milliamperes. It will thus be seen that we provide a new and improved circuit for responding to direct current signals of a selected polarity and magnitude. Good isolation between the line and the control circuit is provided by the light coupling path of the unit 13. Thus, the need for any oscillator is eliminated, and no interference is produced. In addition, the control circuit of FIG. 1 is relatively simple and compact, and hence inexpensive. While we have only indicated the control signal, it will be understood that such a control signal may be supplied to a pulse shaper, such as a multivibrator, to produce sharp or rapidly rising pulses for the actual control function.

FIG. 2 shows a circuit diagram of a multiple function remote control circuit in accordance with our invention. As an example, we have assumed that the circuit of FIG. 2 provides separate and distinct control signals in response to positive and negative currents of 2.5, 6, and 11 milliamperes. Thus, six different functions may be indicated in response to these three different currents with two different polarities. The control line from the operator location is connected to input terminals 16, 17. A low impedance path for audio signals is provided by a capacitor C2. The terminals 16, 17 are connected to input terminals 19, 21 of a full-wave rectifier bridge 18 which comprises four diodes D3, D4, D5, D6 connected between the bridge input terminals 19, 21 and the bridge output terminals 20, 22. The bridge connections are standard except that a polarity sensing, light emitting diode LED-P is connected in series with the diode D3 to produce light in response to positive signals. When the terminal 16 is positive and the terminal 17 is negative, current flows from the bridge input terminal 19 through the diode D3 and the diode LED-P to the bridge output terminal 20. When the terminal 17 is positive and the terminal 16 is negative, no current flows in the diode LED-P. A series output circuit is connected between the bridge output terminals 20, 22. This circuit comprises a resistor R3, a light emitting diode LED-1, a light emitting diode LED-2, and a current indicating resistor R4. The light emitting diodes LED-1, LED-2 may conduct current when their respective shunt transistors are turned off, but can not conduct current when their respective shunt transistors are turned on. The light emitting diode LED-1 is provided with a shunt transistor Q1A of the NPN type, and a shunt transistor Q1B of the PNP type. The light emitting diode LED-2 is provided with only a single shunt transistor Q2 of the NPN type. The base electrodes of these transistors Q1A, Q1B, Q2 are connected to respective current reference circuits. Thus, the base of the transistor Q1A is connected by a diode D8 to a reference circuit comprising a resistor R1A, a zener diode Z1A, and a diode D7. The base of the transistor Q1B is connected by a diode D10 to a reference circuit comprising a resistor R1B, a zener diode Z1B, and a diode D9. And the base of the transistor Q2 is connected by a diode D13 to a reference circuit comprising a resistor R2, a zener diode Z2, and two diodes D11, D12. As will be explained in more detail, the circuit values are chosen so that when there is no current at the terminals 16, 17, the transistors are all turned off and all of the light emitting diodes are turned off. When the current reaches the assumed magnitude of 2.5 milliamperes, the transistors Q1A, Q1B are turned off and their diode LED-1 is on; but the transistor Q2 is on so that its diode LED-2 is off. When the current reaches the assumed magnitude of 6 milliamperes, all three transistors Q1A, Q1B, Q2 are turned off so that their light emitting diodes LED-1, LED-2 are on. When an assumed current of 11 milliamperes is reached, the transistor Q1A is off and the transistor Q1B is on so that their light emitting diode LED-1 is off; and the transistor Q2 is off so that its light emitting diode LED-2 is on.

The three light emitting diodes LED-P, LED-1, LED-2 are respectively coupled to a polarity signal responsive circuit 24, a first signal responsive circuit 25, and a second signal responsive circuit 26. Each of these circuits may be similar to the circuit shown at the right of FIG. 1, and may comprise a light sensitive device such as a transistor, an amplifying arrangement, and preferably a pulse shaping or multivibrator circuit. The responsive circuits 24, 25, 26 are connected to a logic circuit comprising six AND gates 27–32, each of which has three inputs. The logic circuit also comprises five logic inverters 33–37.

Reference to the table of FIG. 3 will assist in understanding the operation of the circuit of FIG. 2. We have assumed that the signal responsive circuits 24, 25, 26 produce a logic 0 in response to no light from their respective light emitting diodes, and produce a logic 1 in response to light from their respective light emitting diodes. When there is no control current, none of the light emitting diodes produce light, and the output of all three circuits 24, 25, 26 is at a logic 0. Hence, the output AND gates 27–32 produce no signal. When current begins to flow and has reached 1 milliampere, the transistors Q1A, Q2 are on, so that the diodes LED-1, LED-2 are off. Hence no signals are produced. When a current magnitude of 2.5 milliamperes is reached, the transistor Q1A is turned off. Since the transistor Q1B is already off, the diode LED-1 is turned on. This causes the first signal responsive circuit 25 to produce a logic 1. The second signal responsive circuit 26 is already producing a logic 0. The logic 0 from the second circuit 26 is inverted by the inverters 33, 36 so that two of the three inputs at the gates 27,30 are at a logic 1. If the current polarity is positive, (i.e., the terminal 16 is + and the terminal 17 is −), the diode LED-P conducts and the polarity signal circuit 24 produces a logic 1. This makes the third input to the gate 27 a logic 1, so that the gate 27 produces an output signal indicating +2.5 milliamperes. However, if the terminal 17 is positive and the terminal 16 is negative, the diode LED-P is off and the polarity signal circuit 24 produces a logic 0. This logic 0 is inverted by the inverter 35 so that all inputs to the gate 30 are at a logic 1. Hence, the gate 30 produces an output signal indicating a current of −2.5 milliamperes.

When a current magnitude of 6 milliamperes is reached, all the transistors Q1A, Q1B, Q2 are off so that both signal circuits 25, 26 produce a logic 1. The gates 28, 31 have two of their three inputs at a logic 1. The third input to these gates 28, 31 is determined by the current polarity in the manner described in the preceding paragraph. And finally, when a current magnitude of 11 milliamperes is reached, the PNP transistor Q1B is turned on because its base voltage falls below its emitter voltage as a result of current flow through the resistor R1B and the zener diode Z1B. The diode LED-1 is turned off and the diode LED-2 remains on. The first circuit 25 produces a logic 0 and the second circuit 26 produces a logic 1. The logic 0 from the circuit 25 is inverted by the inverters 34,37 so that two of the three inputs to the gates 29, 32 are at a logic 1. The third input is determined by the polarity signal in the manner described previously. Thus, the circuit of FIG. 2 provides the same good isolation as did the circuit of FIG. 1, and in addition provides a relatively simple, well isolated arrangement for providing six functions in response to three different currents of two polarities.

While we have shown only two embodiments of our invention, persons skilled in the art will appreciate that modifications may be made. For example, a different number of control functions may be provided. That is, there may be more than one function, or less than six functions. Or, more than six functions may be provided. In FIG. 2 for example, the bridge 18 may be used with one light emitting diode and reference circuit and with a polarity indicating circuit to provide responses to two current polarities and one current magnitude. Or, the bridge 18 may be omitted and several light emitting diodes and reference circuits may be connected to provide responses to one current polarity and several current magnitudes. In addition, a light emitting diode may be provided in the negative current path of the bridge 18 between the bridge input terminal 21 and the bridge output terminal 20, if a separate negative current signal is desired. Different logic circuit arrangements may also be provided. Therefore, it is to be understood that modifications may be made without departing from the spirit of our invention or from the scope of the claims.

What we claim as new and desire to secure by Letters Patent of the United States is:

1. An improved control circuit for responding to a direct current of selected magnitude and polarity applied to a control line from a remote operator location, said improved control circuit comprising:

a. first and second input terminals adapted to be connected to said line;

b. a rectifier bridge having input terminals connected to said first and second input terminals and having positive and negative output terminals;

c. a first current responsive, light producing device connected between one of said bridge input terminals and one of said bridge output terminals for producing light in response to current flow of a selected polarity;

d. a first resistor having one end connected to said positive bridge output terminal;

e. a second current responsive, light producing device having one end connected to the other end of said first resistor;

f. a second resistor connected between the other end of said second light producing device and said negative bridge output terminal;

g. a first transistor having an emitter, a base, and a collector;

h. means connecting said transistor emitter and collector respectively to said ends of said second light producing device;

i. a first reference circuit connected between said positive and negative bridge output terminals for providing a reference voltage;

j. means connected between a point of said reference circuit and said transistor base for causing said transistor to have a first conductive state in response to current at said bridge output terminals below a selected magnitude, and for causing said transistor to have a second conductive state in response to current at said bridge output terminals above said selected magnitude;

k. said second light producing device having first and second states depending upon the conductive state of said transistor;

l. a first light sensitive device positioned in operative relation to said first light producing device for producing control signals in response to the presence and absence of light from said first light producing device;

m. a second light sensitive device positioned in operative relation to said second light producing device for producing control signals in response to the presence and absence of light from said second light producing device;

n. and a utilization circuit coupled to said light sensitive devices.

2. The improved control circuit of claim 1, and further comprising:

a. a third current responsive, light producing device connected in series between said first resistor and said second light producing device;

b. a second transistor having an emitter, a base, and a collector, said second transistor being of the same type as said first transistor;

c. means connecting said second transistor emitter and collector respectively to the ends of said third light producing device;

d. a second reference circuit connected between said positive and negative bridge output terminals for providing a reference voltage;

e. means connected between a point of said second reference circuit and said second transistor base for causing said second transistor to have a first conductive state in response to current at said bridge output terminals below a selected magnitude, and for causing said second transistor to have a second conductive state in response to current at said bridge output terminals above said selected magnitude;

f. and a third light sensitive device positioned in operative relation to said third light producing device for producing control signals in response to the presence and absence of light from said third light producing device.

3. The improved control circuit of claim 1, and further comprising:

a. a third current responsive, light producing device connected in series between said first resistor and said second light producing device;

b. a second transistor having an emitter, a base, and a collector, said second transistor being of the opposite type as said first transistor;

c. means connecting said second transistor emitter and collector respectively to the ends of said third light producing device;

d. a second reference circuit connected between said positive and negative bridge output terminals for providing a reference voltage;

e. means connected between a point of said second reference circuit and said second transistor base for causing said second transistor to have a first conductive state in response to current at said bridge output terminals below a selected magnitude, and for causing said second transistor to have a second conductive state in response to current at said bridge output terminals above said selected magnitude;

f. and a third light sensitive device positioned in operative relation to said third light producing device for producing control signals in response to the presence and absence of light from said third light producing device.

4. An improved remote control circuit for providing control signals in response to direct current of selected magnitudes and polarity on a pair of control wires, said remote control circuit comprising:

a. first and second input terminals adapted to be respectively connected to said pair of control wires;

b. a rectifier bridge having input terminals and positive and negative output terminals;

c. means connecting said bridge input terminals to said first and second input terminals respectively;

d. a polarity sensing light emitting diode connected in series between one of said rectifier bridge input terminals and output terminals;

e. an output circuit comprising a first resistor having one end connected to said positive bridge output terminal, a second light emitting diode having one end connected to the other end of said first resistor, a third light emitting diode having one end connected to the other end of said second light emitting diode, and a second resistor having one end connected to the other end of said third light emitting diode and having the other end connected to said negative bridge output terminal;

f. a first current reference circuit connected between said positive and negative bridge output terminals;

g. a first transistor of a first type having its collector and emitter connected to the ends of said second light emitting diode and having its base connected to a point of said first reference circuit;

h. a second current reference circuit connected in series between said positive and negative bridge output terminals;

i. a second transistor of a second type different from said first type having its collector and emitter connected to the ends of said second light emitting diode and having its base connected to a point of said second reference circuit;

j. a third current reference circuit connected in series between said positive and negative bridge output terminals;

k. a third transistor of said first type having its collector and emitter connected to the ends of said third light emitting diode and having its base connected to a point of said third reference circuit;

l. first, second, and third light sensing circuits positioned in operative relation to said first, second, and third light emitting diodes respectively;

m. and a logic circuit connected to said three light sensing circuits and having six output circuits for producing six respective output signals depending upon three current magnitudes and two current polarities.

5. An improved control circuit for responding to a direct current of selected magnitude and polarity applied to a control line from a remote operator location, said improved control circuit comprising:

a. first and second main input terminals adapted to be connected to said line;

b. a rectifier circuit having input terminals connected to said first and second main input terminals and having output terminals;

c. a first current responsive, light producing device connected in series with said rectifier circuit for producing light in response to current flow of a selected polarity;

d. a second current responsive, light producing device connected between said rectifier circuit output terminals;

e. a first transistor having an emitter, a base, and a collector;

f. means connecting said transistor emitter and collector respectively to said ends of said second light producing device;

g. a first reference circuit connected between said rectifier circuit output terminals for providing a reference voltage;

h. means connected between said reference circuit and said transistor base for causing said transistor to have a first conductive state in response to current at said rectifier circuit output terminals below a selected magnitude, and for causing said transistor to have a second conductive state in response to current at said rectifier circuit output terminals above said selected magnitude;

i. said second light producing device having first and second states depending upon the conductive state of said transistor;

j. a first light sensitive device positioned in operative relation to said first light producing device for producing control signals in response to the presence and absence of light from said first light producing device;

k. a second light sensitive device positioned in operative relation to said second light producing device for producing control signals in response to the presence and absence of light from said second light producing device;

l. and a utilization circuit coupled to said light sensitive devices.

6. The improved control circuit of claim 5, and further comprising:

a. a third current responsive, light producing device connected between said rectifier circuit output terminals and in series with said second light producing device;

b. a second transistor having an emitter, a base, and a collector, said second transistor being of the same type as said first transistor;

c. means connecting said second transistor emitter and collector respectively to the ends of said third light producing device;

d. a second reference circuit connected between said rectifier circuit output terminals for providing a reference voltage;

e. means connected between said second reference circuit and said second transistor base for causing said second transistor to have a first conductive state in response to current at said rectifier circuit output terminals below a selected magnitude, and for causing said second transistor to have a second conductive state in response to current at said rectifier circuit output terminals above said selected magnitude;

f. and a third light sensitive device positioned in operative relation to said third light producing device for producing control signals in response to the presence and absence of light from said third light producing device.

7. The improved control circuit of claim 5, and further comprising:

a. a third current responsive, light producing device connected between said rectifier circuit output terminals and in series with said second light producing device;

b. a second transistor having an emitter, a base and a collector, said second transistor being of the opposite type as said first transistor;

c. means connecting said second transistor emitter and collector respectively to the ends of said third light producing device;

d. a second reference circuit connected between said rectifier circuit output terminals for providing a reference voltage;

e. means connected between said second reference circuit and said second transistor base for causing said second transistor to have a first conductive state in response to current at said rectifier circuit output terminals below a selected magnitude, and for causing said second transistor to have a second conductive state in response to current at said rectifier circuit output terminals above said selected magnitude;

f. and a third light sensitive device positioned in operative relation to said third light producing device for producing control signals in response to the presence and absence of light from said third light producing device.

* * * * *